(12) United States Patent
Hiron

(10) Patent No.: US 8,549,990 B2
(45) Date of Patent: Oct. 8, 2013

(54) COFFEEMAKER COMPRISING A FOAM-MAKING DEVICE

(75) Inventor: Frederic Hiron, Asse le Boisne (FR)

(73) Assignee: SEB S.A., Ecully (FR)

( * ) Notice: Subject to any disclaimer, the term of this patent is extended or adjusted under 35 U.S.C. 154(b) by 1502 days.

(21) Appl. No.: 11/919,063

(22) PCT Filed: Apr. 18, 2006

(86) PCT No.: PCT/FR2006/000864
§ 371 (c)(1),
(2), (4) Date: Oct. 23, 2007

(87) PCT Pub. No.: WO2006/120314
PCT Pub. Date: Nov. 16, 2006

(65) Prior Publication Data
US 2009/0308256 A1    Dec. 17, 2009

(30) Foreign Application Priority Data
May 4, 2005 (FR) ..................................... 05 04579

(51) Int. Cl.
*A47J 31/40* (2006.01)
*A47J 31/00* (2006.01)

(52) U.S. Cl.
USPC ................... 99/287; 99/275; 99/383; 99/285; 99/295; 99/300; 99/302 R; 99/303; 99/323; 426/433

(58) Field of Classification Search
CPC ... A47J 31/46; A47J 31/4496; A47J 31/0668; A47J 31/44; A47J 31/06
USPC ....... 99/287, 275, 323, 302 R, 303, 283, 285, 99/295, 300; 426/115, 77, 433
See application file for complete search history.

(56) References Cited

U.S. PATENT DOCUMENTS

| | | | | |
|---|---|---|---|---|
| 3,628,444 A | * | 12/1971 | Mazza | 99/275 |
| 4,113,147 A | * | 9/1978 | Frazier et al. | 222/131 |
| 4,739,697 A | * | 4/1988 | Roberts | 99/295 |
| 4,922,810 A | * | 5/1990 | Siccardi | 99/323.1 |
| 5,265,520 A | * | 11/1993 | Giuliano | 99/323.1 |
| 5,509,349 A | * | 4/1996 | Anderson et al. | 99/323.1 |
| 5,537,914 A | * | 7/1996 | Gibney et al. | 99/323.2 |
| 5,685,639 A | * | 11/1997 | Green | 366/101 |

(Continued)

FOREIGN PATENT DOCUMENTS

| | | |
|---|---|---|
| EP | 1 498 059 A1 | 1/2005 |
| WO | 00/07488 A | 2/2000 |
| WO | 2004/100739 A1 | 11/2004 |

*Primary Examiner* — Henry Yuen
*Assistant Examiner* — Brett Spurlock
(74) *Attorney, Agent, or Firm* — Young & Thompson

(57) ABSTRACT

A coffee machine includes a hot water generator, an infusion chamber for receiving an infusible product, an infusion dispensing outlet (6) and a foam producing device (40), which is interposed between the infusion chamber and the dispensing outlet and is provided with at least two outlet orifices (43, 44) arranged with respect to each other in such a way that two infusion jets, which are formed at exit, collide with each other, thereby producing a foam. The two outlet orifices (43, 44) are oriented to each other at an angle of 90 degrees in such a way that the first outlet orifice (43) is oriented in a vertical direction whereas the second outlet orifice (44) is oriented in a horizontal direction and placed in such a way that the collision of the two infusion jets takes place under the first orifice.

10 Claims, 2 Drawing Sheets

(56) References Cited

U.S. PATENT DOCUMENTS

| | | | |
|---|---|---|---|
| 5,706,720 A * | 1/1998 | Goch et al. | 99/455 |
| 5,711,880 A * | 1/1998 | Friedrich et al. | 210/498 |
| 5,769,135 A * | 6/1998 | Mahlich | 141/70 |
| 5,862,740 A * | 1/1999 | Grossi | 99/293 |
| 6,006,655 A * | 12/1999 | Bielfeldt et al. | 99/306 |
| 6,098,524 A * | 8/2000 | Reese | 99/280 |
| 6,499,389 B1 * | 12/2002 | Probst | 99/323.1 |
| 6,713,110 B2 * | 3/2004 | Imboden et al. | 426/511 |
| 6,840,158 B2 * | 1/2005 | Cai | 99/323.1 |
| 7,021,206 B2 * | 4/2006 | Eckenhausen et al. | 99/452 |
| 7,032,504 B2 * | 4/2006 | Lee | 99/287 |
| 7,147,131 B2 * | 12/2006 | Sher et al. | 222/1 |
| 7,243,598 B2 * | 7/2007 | Halliday et al. | 99/295 |
| 2002/0178932 A1 * | 12/2002 | Cai | 99/516 |
| 2003/0213373 A1 * | 11/2003 | Dickson, Jr. | 99/348 |
| 2004/0118291 A1 * | 6/2004 | Carhuff et al. | 99/275 |
| 2004/0187696 A1 * | 9/2004 | Halliday et al. | 99/295 |
| 2005/0076783 A1 | 4/2005 | Kodden et al. | |
| 2005/0087567 A1 * | 4/2005 | Nielsen et al. | 222/361 |
| 2005/0121466 A1 * | 6/2005 | Sher et al. | 222/129.1 |
| 2006/0230942 A1 * | 10/2006 | Noordhuis | 99/275 |
| 2006/0230943 A1 * | 10/2006 | Stieger et al. | 99/279 |
| 2007/0080169 A1 * | 4/2007 | Sher et al. | 222/129.1 |
| 2007/0295226 A1 * | 12/2007 | Gierth et al. | 99/452 |
| 2008/0295699 A1 * | 12/2008 | Duineveld et al. | 99/302 R |

* cited by examiner

COFFEEMAKER COMPRISING A FOAM-MAKING DEVICE

BACKGROUND OF THE INVENTION

This invention relates to a coffeemaker comprising a hot water generator, an infusion chamber that is designed to hold a product to be infused and that is fed by said generator, at least one outlet for distribution of the infusion, and a foam-making device that is inserted between said infusion chamber and said distribution outlet and that comprises at least two outlet openings, in a suitable section, arranged relative to one another so as to create at the outlet respectively at least two infusion jets that collide with one another when the foam is being formed.

A product support that is to be infused and that has a circular bottom delimiting the lower part of an infusion chamber, when it is placed in a coffeemaker, is known from the document U.S. Pat. No. 5,711,880. The bottom of this support has calibrated openings that form suitable channels for creating infusion jets. The support openings are arranged in pairs so as to face one another. The infusion that passes through a pair of these openings forms two liquid jets that are directed against one another and that collide by forming with one another an angle that is close to 180 degrees. It is indicated that the collision of the jets under this angle is particularly favorable for making foam.

However, the thus produced foam-making device has various drawbacks, primarily linked to the fact that the latter is closely linked to the product support to be infused.

The product support to be infused is actually to perform functions that are differentiated from the foam-making device, such as, for example, to play the filter role if the product to be infused comes in the form of a loose grind, or to ensure a simple support function while making possible a passage of the infusion through the latter if the product to be infused comes in the form of one dose of grind packed in a filter paper packet, generally called a dosette. The product support to be infused also has as its function to define the volume and the geometric shape of the infusion chamber to adapt to the amount of infusion to prepare or to the type of dosette to hold; actually, there currently exist so-called "coffee" machines that can not only prepare coffee from the dosette or coffee grind, but also other infusion types, such as, for example, tea, a chocolate drink, hot milk, or a mixture of these products. It is therefore necessary to design product supports to be infused that have different characteristics to adapt in particular to the nature and to the volume of these products. Consequently, the unit design of the support and the foam-making device as described in the document U.S. Pat. No. 5,711,880 proves unsuitable. In addition, there may exist a need for using a product support to be infused that has given characteristics with or without a foam-making device according to the type of drink that it is desired to prepare.

The applicant has therefore concluded that there was a need to separate the functions of the product support to be infused and the functions of the foam-making, it being understood that the foam-making device is to be placed beyond the infusion chamber to treat the liquid infusion that is prepared in the chamber. However, an arrangement of the foam-making device downstream from the infusion chamber requires taking into consideration the available space for this device and in particular for arranging the openings opposite one another while taking into account the infusion feed of these openings. This therefore brings about an additional production constraint, primarily if the foam-making device is to be integrated in a standard-size filter holder or a filter holder that is designed to hold a particularly large amount of product to be infused.

In contrast, it is also necessary to take into consideration the flow of the infusion behind the foam-making device, from which the pressure of the infusion is considerably reduced, approximately equal to the atmospheric pressure for a low-pressure machine, and the flow is obtained essentially by gravity. Actually, an accumulation of the infusion or an insufficient flow can bring about a premature fouling of the pipes, primarily in the case of milk-containing drinks.

SUMMARY OF THE INVENTION

This invention therefore has as its object to produce a foam-making device of the infusion jet collision type, which is compact while obtaining a satisfactory flow of the infusion.

For this purpose, this invention has as its object a coffeemaker of the above-mentioned type, characterized in that the at least two outlet openings are oriented relative to one another along an angle of approximately 90 degrees, whereby at least a first outlet opening is oriented vertically and at least a second outlet opening is oriented horizontally and arranged, relative to said first outlet opening, so that the collision of the infusion jets is located under said first opening.

Thus, the openings form a more closed angle and, consequently, the inlets of the latter are drawn close to one another. The outlets that create the jets can also be drawn close together because there is no risk that the jet of one of the outlets will hinder or block the jet of the other outlet or even that the infusion jet that is created by an opening partially penetrates the other opening. Furthermore, contrary to what could be expected, the fact that the jets intercept one another essentially at a right angle has a significant, favorable effect on the formation of foam.

In addition, the relative arrangement of the openings causes the foamy infusion to preserve, after the collision point, a component of movement directed toward the distribution outlet, although it comes in atomized form after this point. Its flow by gravity toward the distribution outlet is thus promoted.

In preferred embodiments of the invention, it is also possible to resort to one and/or the other of the following arrangements:

- The machine also comprises a removable filter holder that comprises a cup for holding the product to be infused, and an outlet opening of the infusion, whereby the foam-making device is arranged inside the filter holder, between the cup and the outlet opening of the filter holder;
- The filter holder comprises a flow pipe that communicates with the outlet opening and that has a free end that forms the distribution outlet of the infusion, whereby the foam-making device is arranged inside the pipe of the filter holder;
- The foam-making device comprises a body in which the two outlet openings are made;
- At least one sealing joint is arranged between the body and the inside wall of the flow pipe;
- The outlet openings of the foam-making device are fed by infusion by a common collecting chamber; and
- The outlet openings of the foam-making device empty into a jet collision chamber that communicates with the distribution outlet.

Other characteristics and advantages of the invention will emerge from the following description, provided by way of nonlimiting example, with reference to the accompanying drawings, in which:

DESCRIPTION OF PREFERRED EMBODIMENTS

In the various figures, identical references were maintained to designate identical or similar elements.

Figure 1:
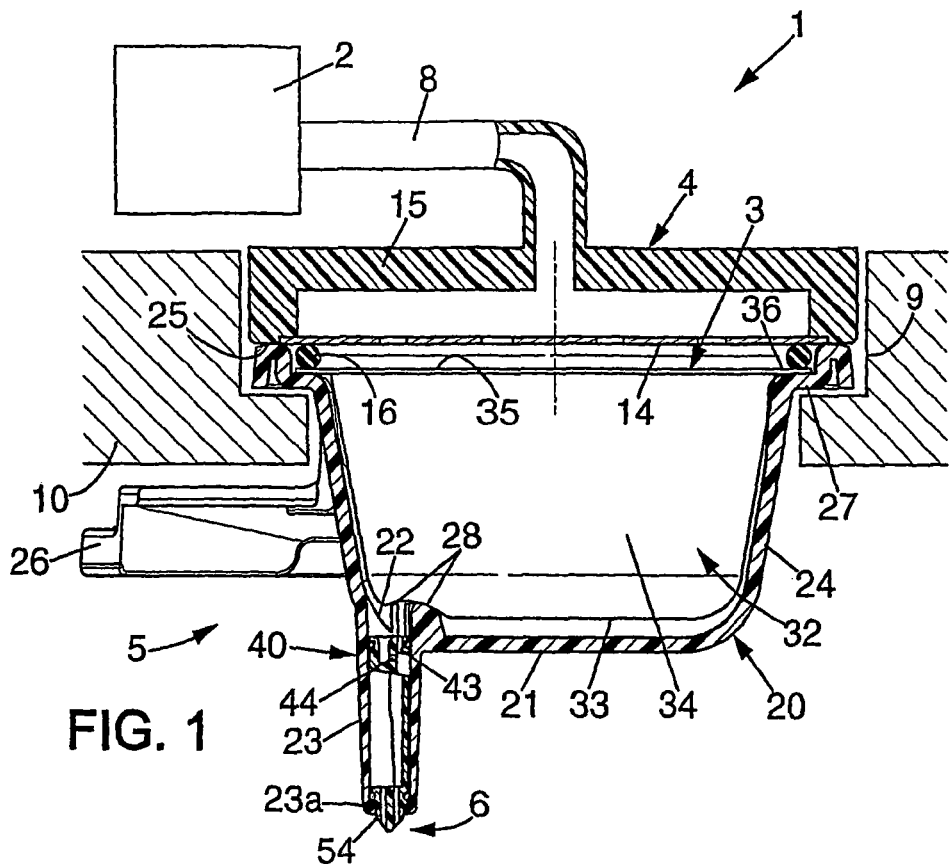
FIG. 1 is a diagrammatic cutaway view of a coffeemaker machine that is equipped with a filter holder that comprises a dosette of the product to be infused and a foam-making device according to the invention.

In FIG. 1, a coffeemaker 1 that comprises a hot water generator 2, an infusion chamber 3 that is delimited in the embodiment that is shown by a sprayer 4 and a filter holder 5 and a distribution outlet 6 of the infusion is diagrammatically shown.

The hot water generator 2 can be of any known type in the coffeemakers, but it is preferably an electrically heated boiler that comprises a suitable device for delivering hot water under low pressure, i.e., pressure on the order of two bars. The generator 2 is connected to the sprayer 4 by a hot-water feed pipe 8.

The infusion chamber 3 is delimited in its upper part by the sprayer 4, and laterally, as well as in its lower part, by the filter holder 5. The filter holder 5 rests in a housing 9 that is formed in a first part 10 of the box of the coffeemaker 1, while the sprayer 4 is integral with a second part of the box that is not shown, movable relative to the first part 10, and preferably articulated relative to the latter, so as to provide access to the infusion chamber 3.

The sprayer 4 comprises a perforated metal disk 14 that is topped with a cover 15 into which empties the hot water feed pipe 8, and an annular sealing joint 16 that is suitable for ensuring the sealing between the sprayer 4 and the filter holder 5.

The filter holder 5 is formed by a cup 20 that has a bottom 21, an annular lateral wall 24 that extends from the bottom 21 up to an upper periphery 25 against which rests the cover 15 of the sprayer 4, and a gripping handle 26. The annular wall 24 has a radially exterior shoulder 27 close to the upper periphery 25.

The bottom 21 of the cup 20 has an opening 22 that empties into a flow pipe 23 that extends vertically. The flow pipe 23 has a free end 23a that forms the outlet opening of the infusion of the filter holder 5. The presence of ribs 28 that extend upward from the bottom 21 and are arranged radially relative to the opening 22 in a peripheral zone of this opening will be noted.

The cup 20 of the filter holder 5 holds a dosette 32 of the product to be infused. The dosette 32 is a flexible pocket made of filter paper that contains the product to be infused. In this case, this is a dosette that is intended for the preparation of coffee with milk, also called "creamy." For this purpose, it contains the coffee grind and the powder milk in large amounts since a "creamy" coffee represents a relatively high drink volume per person, very clearly greater than that of an "espresso"-type coffee. The dosette 32 has a flat bottom 33 from which a slightly conical body 34 extends up to a circular plane upper face 35 made of filter paper. The upper face 35 of the dosette 32 forms an annular peripheral collar 36 relative to the body 34. The collar 36 is pressed against the flange 27 of the cup 20 by the sealing joint 16 of the sprayer 4 in the embodiment that is diagrammatically shown in FIG. 1.

The dosette 32 is supported in part by the annular wall 24 of the cup 20, which has a conicity that is essentially identical to that of the body 34 of the dosette, as well as by the ribs 28 of the cup that rest against the bottom 33 of the dosette by creating a hollow locally on the latter, and optionally by the bottom 21 of the cup against which the bottom 33 of the dosette can come into contact if the latter has just been deformed under the effect of the passage of the infusion. Thus, in the embodiment shown in FIG. 1, the infusion chamber 3 is delimited in its lower part by the tip of the ribs 28 of the cup 20 and the bottom 21 itself. The bottom 21 of the cup 20 also has as its function to collect the infusion and to direct the latter toward the opening 22. However, it is perfectly conceivable that the filter holder 5 has a product support to be infused, separate from the bottom 21 of the cup 20 and made, for example, by a perforated plate that extends between the annular wall 24 of the cup and at a distance from the bottom 21 of the latter. In this case, this is the perforated plate and the upper part of the cup extending from the plate, which constitute a cup for holding the product to be infused, whereby the bottom 21 of the cup 20 then has only the function of collecting the infusion.

It will be noted that the filter holder 5 is removably mounted in the housing 9 of the first part 10 of the box. Once the sprayer 4 is released from the housing 9, the handle 26 of the filter holder 5 makes it possible to release the latter from the housing 9, against which it rests by the radial flange 27, by carrying out a movement upward. This removable mounting of the filter holder 5 in the coffeemaker 1 proves to be very practical and is requested by numerous users. Actually, it makes it possible to manage the filter holder to install a dosette more easily, and primarily it makes it possible to throw out the used dosette without having to touch it, for example by bringing the filter holder 5 back over a trash can. In addition, the removable assembly of the filter holder makes it possible to place inside the same coffeemaker filter holders that have identical outside dimensions but with a different inside structure to prepare different infusions using dosettes of different geometry or optionally product to be infused that is packaged in bulk.

In the embodiment that is shown in FIG. 1, the free end 23a of the flow pipe 23 forms the distribution outlet 6 of the infusion, such that in this example, the outlet opening of the filter holder 5 and the distribution outlet 6 are combined. It is conceivable, of course, that the infusion that flows through the outlet opening of the filter holder 5 is collected by another part of the coffeemaker to be directed toward a distant distribution outlet by means of pipes. However, the fact that the distribution outlet 6 is formed by the end 23a of the flow pipe 23 makes it possible to limit to the filter holder 5 the parts of the machine that are optionally fouled by the infusion. However, because of this removable assembly in the first part 10 of the box, the filter holder 5 is particularly easy to clean.

Figure 3:
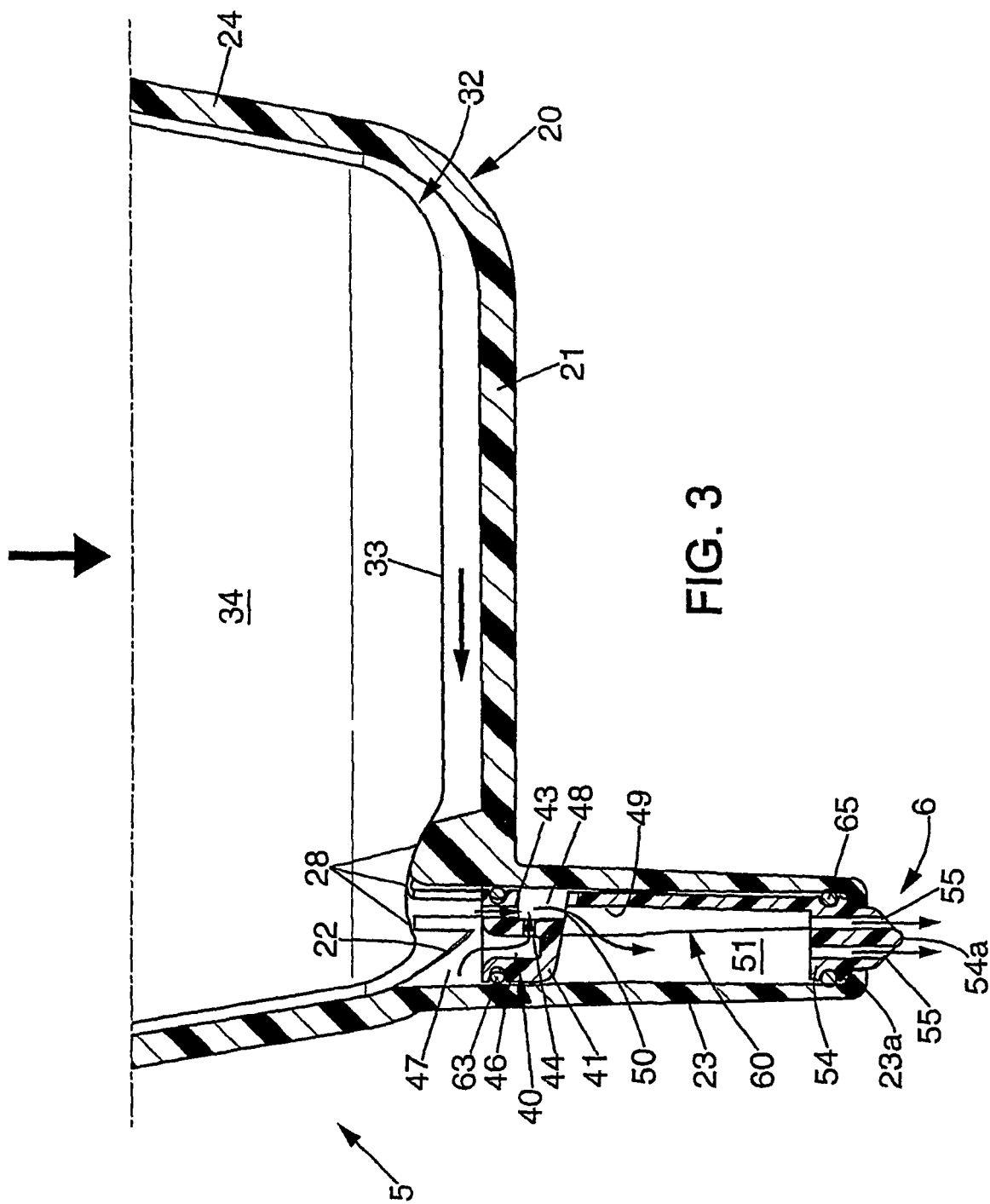
FIG. 3 is an enlarged partial view of the filter holder shown in FIG. 1.

A foam-making device 40 is arranged inside the pipe 23 of the removable filter holder 5. As can be seen in FIG. 3, the foam-making device 40 comprises a body 41 that is made of plastic material and that comprises a first opening 43 and a second opening 44, both made in the form of cylindrical through holes. The infusion that passes through the dosette 32 is collected by the bottom 21 of the cup 20 and is then directed toward the opening 22 of the cup 20. Then, the infusion exits through the two openings (43, 44). These outlet openings (43, 44) have a suitable section based on the flow rate and the pressure of the infusion, such that the infusion exits from the latter in the form of fine liquid jets. As can be seen in FIG. 3, the two openings (43, 44) are arranged relative to one another such that the infusion jets that are created collide with one another by forming the foam. More particularly, the two openings (43, 44) are located in the same plane, but oriented relative to one another along an angle of 90 degrees, such that the jets that are created perpendicularly intercept one another.

The first opening 43 is oriented vertically; the infusion jet that exits from the first opening 43 is therefore directed downward, i.e., overall in the direction of the free end 23a of the pipe 23 and the distribution outlet 6. The second opening 44 is oriented horizontally, but is located under the first opening 43, such that the collision of the infusion jets takes place under the first opening 43. This arrangement of the openings (43, 44) causes the foamy infusion to preserve, after the collision point, a component of movement directed toward the distribution outlet 6, although it comes in atomized form after this point. Its flow by gravity toward the distribution outlet 6 is thus promoted.

In addition, by this arrangement of the openings (43, 44), the vertical infusion jet that exits from the opening 43 under the effect of the pressure and the gravitation has a slightly higher speed than that of the horizontal infusion jet, which exits from the opening 44 only under the effect of the pressure; this difference in speeds between the two infusion jets, respectively vertical and horizontal, has as its advantage to promote in particular the formation of foam. It also holds true that this arrangement of the two openings (43, 44) is favorable for the elimination of the traces of infusion that can still exist after the preparation of a drink, elimination that is achieved, for example, by sending a vapor jet into the infusion chamber. Of course, the vertical and horizontal orientations should be considered when the foam-making device and the machine are in a configuration of use and when a limited inclination relative to these directions is possible while keeping the advantages mentioned above.

As illustrated in FIG. 3, the body 41 has a well 46 that empties toward the opening 22 of the bottom 21 of the cup 20, which has a section that is very clearly superior to the section of the second opening 44. With the portion of the pipe 23 that extends up to the opening 22 and the ribs 28, the well 46 delimits a released space in which the infusion is collected to feed the first opening 43 and the second opening 44. The thus formed collecting chamber 47 makes it possible to feed each of the two openings (43, 44) under identical pressure, because there is no pressure drop between the inlet of the first opening 43 and the inlet of the second opening 44. This promotes obtaining a collision of the nominal jets, even if the dosette 32 is more or less correctly placed in the filter holder 5.

The two openings (43, 44) empty into a collision chamber 48, FIG. 3, delimited by the body 41, the pipe 23 and the tip of a wing 49 that extends along the inside wall of the pipe 23. An opening 50 that is made between the tip of the wing 49 and the body 41 makes possible the communication of the collision chamber 48 with the distribution outlet 6. It will be noted that the opening 50 of the collision chamber 48 has a section that is very clearly superior to the section of the openings (43, 44) because the chamber 48 is not to be filled with infusion. Actually, so that the collision of the jets produces the formation of fine bubbles in the infusion, it is preferable that air be present in the collision chamber 48.

It has proven of value that the fact of providing a relatively closed collision chamber 48 as well as the collision of jets along an angle of about 90 degrees promotes in particular the creation of fine foam.

A free space 51 (FIG. 3) that is located under the body 41 and above an element 54 presented in detail below and delimited laterally by the pipe 23 and the wing 49 constitutes a reserve of air for the collision chamber 48. The infusion that is sprayed into the collision chamber 48 passes through the free space 51 essentially by flowing by gravity along vertical walls of this space.

As FIG. 3 shows it, the element 54 is arranged inside the free end 23a of the pipe 23 and forms with the latter the distribution outlet 6. The outlet element 54 also has the shape of a plug that comprises vertical channels 55 that come in the form of elongated cylindrical through holes. The entire section of all the channels 55 is larger than the entire section of the outlet openings (43, 44) of the foam-making device 40, so that the infusion that exits from these channels 55 is not in the form of powerful jets that could create splashing at the distribution outlet 6. However, their entire section is not to be too large, so that they are filled by the infusion when the latter passes through them. Thus, and because of the elongation of the channels 55, a uniform flow of the foamy infusion at the distribution outlet 6 is obtained.

Figure 2:
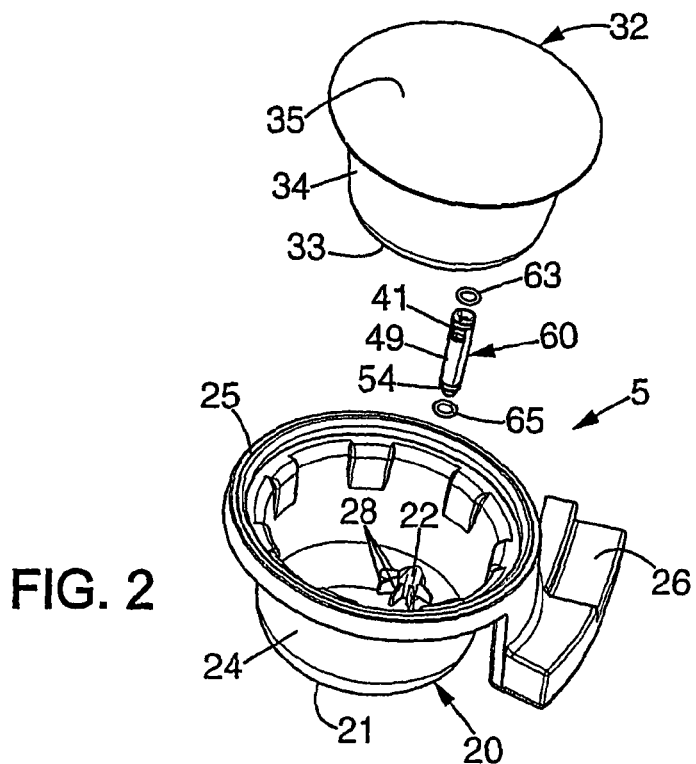
FIG. 2 is an exploded view of the filter holder shown in FIG. 1.

The wing 49 connects the body 41 of the foam-making device 40 to the outlet element 54, such that the unit of these three elements (41, 49, 55) forms only a single piece that is designated by the reference 60 in FIG. 2.

The piece 60 that thus forms the body 41 of the foam-making device 40 and the outlet element 54 is mounted in a removable manner inside the pipe 23 and extends over essentially the entire height of the latter, whereby the body 41 is located in the upper portion of the pipe 23.

The outlet element 54 has an end 54a that projects relative to the free end 23a of the pipe 23. Thus, by exerting pressure with the finger on the end 54a, the piece 60 is pushed back toward the opening 22 of the bottom of the cup 20 and can then be easily removed from the filter holder. The removable assembly of the piece 60 is advantageous for cleaning the latter, and more practically the two openings (43, 44) of the foam-making device 40. It will be noted that the fact of making the body 41 of the foam-making device in a single piece with the wing 49 and the outlet element 54 makes it possible to obtain a piece 60 that has large enough dimensions to be easily handled, although the foam-making device 40 is small in size. The piece 60 is preferably injection-molded of plastic material.

A first O-ring seal 63, FIG. 3, is arranged in a peripheral groove of the body 41 and comes into contact with the inside wall of the pipe 23, so as to ensure the sealing between these two elements. Actually, a leakage of infusion between the pipe 23 and the body 41 would reduce the flow passing through the outlet openings (43, 44) and would hamper the formation of foam.

Analogously, a sealing joint 65 surrounds the outlet element 54 and comes into contact with the inside wall of the pipe 23 so as to ensure the sealing between these two elements and to prevent the appearance of traces of infusion at the free end 23a of the pipe.

The embodiment that is described above is in no way limiting, and it is possible in particular to provide more than two outlet openings for the foam-making device, it being understood that at least two of these openings should be oriented approximately at 90 degrees. It is also possible to arrange the foam-making device in a filter holder that has a different structure, for example with a perforated support that is suitable for supporting a dosette or for holding loose grind. An assembly that is essentially different from the filter holder in the coffeemaker can also be designed.

The invention claimed is:

1. Coffeemaker comprising:
    a hot water generator (2),
    an infusion chamber (3) that is designed to hold a product to be infused and fed by said generator (2),
    at least one outlet (6) for distribution of the infused product, and
    a foam-making device (40) between said infusion chamber (3) and said distribution outlet (6) and that comprises at least two outlet openings (43, 44), in a suitable section, arranged relative to one another so as to create at the outlet openings respectively at least two infusion jets that collide with one another to form foam, each of said at least two outlet openings having a respective different connection to said infusion chamber,
    wherein the at least two outlet openings (43, 44) are oriented relative to one another along an angle of about 90 degrees, wherein at least a first of the outlet openings (43) is oriented vertically and at least a second of the outlet openings (44) is oriented horizontally and is arranged, relative to said first outlet opening (43), so that the collision of the infusion jets is located under said first opening.

2. Coffeemaker according to claim 1, also comprising a removable filter holder (5) that comprises a cup (20) for holding the product to be infused, and an outlet opening (23*a*) of the infused product, wherein the foam-making device (40) is arranged inside the filter holder (5) between the cup (20) and the outlet opening (23*a*) of the filter holder.

3. Coffeemaker according to claim 2, wherein the filter holder (5) comprises a flow pipe (23) that communicates with the outlet opening (23*a*) and that has a free end that forms the distribution outlet (6), wherein the foam-making device (40) is arranged inside the pipe (23) of the filter holder (5).

4. Coffeemaker according to claim 3, wherein the foam-making device (40) comprises a body (41) in which the two outlet openings (43, 44) are made, said body (41) being made of a single piece of molded plastic material.

5. Coffeemaker according to claim 4, wherein at least one sealing joint (63; 65) is arranged between the body (41) and the inside wall of the flow pipe (23).

6. Coffeemaker according to claim 1, wherein the outlet openings (43, 44) of the foam-making device (40) are fed by infusion through a common collecting chamber (47).

7. Coffeemaker according to claim 1, wherein the outlet openings (43, 44) of the foam-making device (40) empty into a jet collision chamber (48) that communicates with the distribution outlet (6) such that the infused product flows by gravity from said collision chamber (48) to said distribution outlet (6).

8. Coffeemaker according to claim 1, wherein the foam-making device (40) comprises a body (41) in which the two outlet openings (43, 44) are made, said body (41) being made of a single piece of molded plastic material.

9. Coffeemaker according to claim 2, wherein the outlet openings (43, 44) of the foam-making device (40) are fed by infusion through a common collecting chamber (47).

10. Coffeemaker according to claim 2, wherein the outlet openings (43, 44) of the foam-making device (40) empty into a jet collision chamber (48) that communicates with the distribution outlet (6) such that the infused product flows by gravity from said collision chamber (48) to said distribution outlet (6).

\* \* \* \* \*

UNITED STATES PATENT AND TRADEMARK OFFICE
CERTIFICATE OF CORRECTION

PATENT NO.       : 8,549,990 B2                                                      Page 1 of 1
APPLICATION NO.  : 11/919063
DATED            : October 8, 2013
INVENTOR(S)      : Frederic Hiron It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1549 days.

Signed and Sealed this
Fifteenth Day of September, 2015

Michelle K. Lee
*Director of the United States Patent and Trademark Office*